United States Patent [19]

Grayson

[11] 3,754,704
[45] Aug. 28, 1973

[54] OVEN VALVE CIRCUIT AND THERMOSTATIC ACTUATOR THEREFOR

[75] Inventor: Richard Davis Grayson, Arcadia, Calif.

[73] Assignee: International Telephone and Telegraph Corporation, New York, N.Y.

[22] Filed: Aug. 30, 1971

[21] Appl. No.: 176,139

[52] U.S. Cl.................. 236/15 A, 236/46, 337/310
[51] Int. Cl.......................... G05d 23/22, F23n 5/10
[58] Field of Search................... 337/310; 236/13 A, 236/46 D, 21 B, 75; 431/57

[56] References Cited
UNITED STATES PATENTS

| | | | |
|---|---|---|---|
| 2,217,785 | 10/1940 | Betz et al............................... | 431/57 |
| 2,249,442 | 7/1941 | Thornbery........................... | 431/86 |
| 3,281,074 | 10/1966 | Solomon........................ | 236/46 D |
| 3,354,279 | 11/1967 | Lamar............................. | 337/310 X |
| 3,469,779 | 9/1969 | Wolfe et al. ................... | 236/46 D X |

*Primary Examiner*—William E. Wayner
*Attorney*—C. Cornell Remsen, Jr. et al.

[57] ABSTRACT

A gas oven having one thermostat switch operated main burner solenoid valve utilizing a pilot heated thermoelectric generator for electrical power to energize the valve solenoid. The generator, the solenoid and the one switch are thus connected in series in a closed loop. A timer and another thermostat switch are connected in a series circuit that shunts the solenoid or thermoelectric generator or both. Opening and closing of the one switch controls baking temperature. The timer switch disables the other switch until the baking period of time has ended. The timer switch then closes and permits the other switch to act as an override and periodically to provide a short circuit to keep the oven warm, but at a temperature, e.g., 170°F., less than the baking temperature. The short circuiting of the solenoid or thermoelectric generator is an outstanding advantage because expensive gold or platinum plated contacts and unreliability are avoided and the time-control circuit is simplified. Inexpensive high resistance contacts in the closed loop are undesirable because of the low e.m.f. provided by the thermoelectric generator. A single thermostatic actuator operates both of the thermostat switches. The single thermostatic actuator makes possible a substantial equipment and cost saving. The actuator is also of an economical construction because leaf springs and a diaphragm bias spring are employed.

8 Claims, 7 Drawing Figures

3,754,704

OVEN VALVE CIRCUIT AND THERMOSTATIC ACTUATOR THEREFOR

BACKGROUND OF THE INVENTION

This invention relates to cooking apparatus, and more particularly, to a low voltage system to keep a gas oven at one or more approximately constant temperatures.

In the past, it has been the practice to utilize the available e.m.f. from a thermoelectric generator heated by a gas pilot. The main burner valve solenoid is thus connected to the generator periodically by a thermostat to keep the oven at a preset baking temperature. Generally, the thermostat switch contacts are gold or platinum plated to reduce the contact resistance. Thus, the introduction of further series contacts, even when gold plated, can thus cause further contact resistance and load the generator so that it will not reliably energize the main valve solenoid. Prior art keep warm systems are complicated. It has, therefore, been impossible to economically control prior art ovens to bake food or to keep food warm after it has been cooked.

SUMMARY OF THE INVENTION

In accordance with the device of the present invention, the abovedescribed and other disadvantages of the prior art are overcome by providing an economical thermostatic actuator.

According to one feature of the invention, a single thermostatic actuator is provided for a first switch that periodically short circuits the generator or the solenoid winding for keep warm temperature control, and a second switch which connects the generator and winding for baking temperature control.

The first switch contacts are thus not connected in series with the generator and solenoid winding to introduce unreliability by the addition of more contact resistance.

It is also a feature of the invention that the selfsame thermostatic actuator may be employed to operate both of the first and second switches. A substantial equipment and cost saving are, therefore, achieved.

Another feature of the invention resides in the use of leaf springs which are less expensive than levers employed in the prior art.

Still a further feature of the invention resides in an economical bias spring for a diaphragm in the thermostatic actuator.

The above-described and other advantages of the present invention will be better understood from the following detailed description when considered in connection with the accompnaying drawings.

BRIEF DESCRIPTION OF THE DRAWINGS

In the drawings which are to be regarded as merely illustrative.

DESCRIPTION OF THE PREFERRED EMBODIMENT

Figure 1:
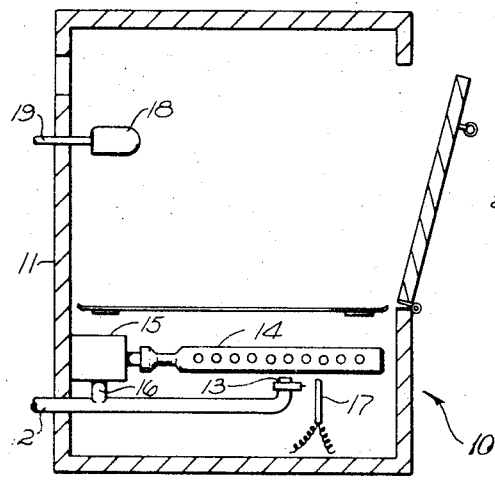
FIG. 1 is a vertical sectional view through an oven which may be employed with the present invention.

In FIG. 1, an oven is indicated at 10 having a housing 11, a gas fuel inlet ocnduit 12 connected to a pilot burner 13, a main burner 14 and a solenoid valve 15. Solenoid valve 15 receives gas by a connection 16 from inlet 12. Valve 15 controls whether or not gas is admitted to main burner 14. A thermoelectric generator 17 is positioned adjacent pilot burner 13 to be heated by gas burning thereat. A metal bulb 18 contains a thermally expansible liquid. The bulb 18 and the liquid thus form a part of the thermostat, to be described. A hollow tube 19 is sealed to bulb 18. Tube 19 carries the said fluid to a flexible diaphragm 20 shown in FIG. 2 which moves downwardly or upwardly in FIG. 2 depending upon the temperature of the fluid in bulb 19.

The oven 10, and all parts thereof thus far described in connection with FIG. 1, may, by themselves only, be entirely conventional. The same is true of all the structures shown in FIG 1. The same is true of diaphragm 20.

Figure 2:
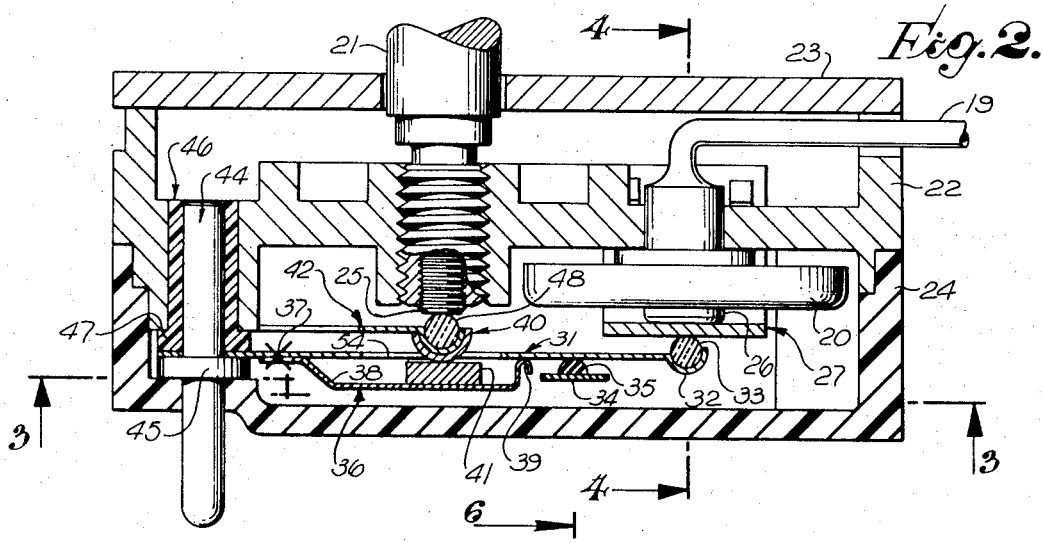
FIG. 2 is a vertical sectional view through a portion of a thermostat constructed in accordance with the present invention.

The baking temperature of the oven 10 is set by adjusting the rotational position of a shaft 21, shown in FIG. 2. Shaft 21 is threaded through a plate 22. Plate 22 has an upper cover 23 fixed thereto by any conventional means such as screws. Plate 22 also has a lower cover 24 fixed to plate 22 by any conventional means. Plate 22 and cover 23 may be made of, for example, metal. Cover 24 may be made of a dielectric material.

Shaft 21 has a calibration screw 25 threaded into the lower end thereof.

Figure 4:
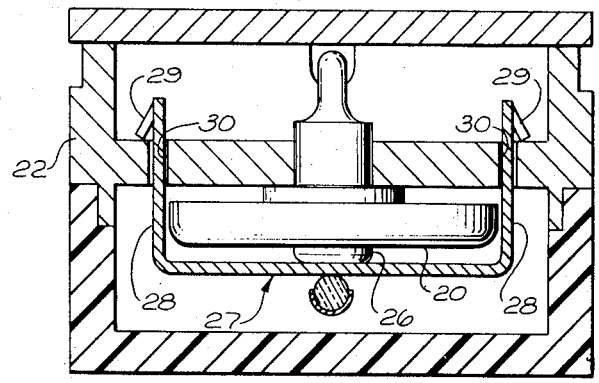
FIG. 4 is another vertical sectional view through the thermostat portion taken on the line 4—4 shown in FIG. 2.
Figure 5:
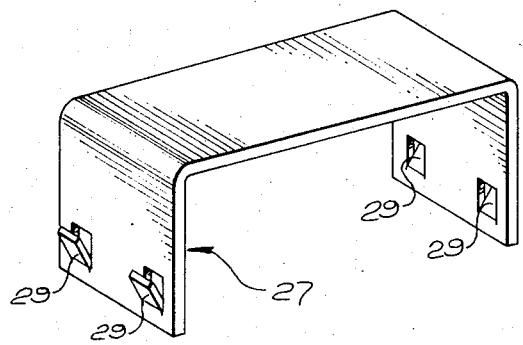
FIG. 5 is a perspective view of a diaphragm spring shown in FIGS. 2, 3 and 4.

Diaphragm 20 has a buttom 26 fixed thereto. A U-shaped spring 27 biases diaphragm 20 upwardly as viewed in FIG. 2. It is a feature of the invention that leaf spring 27 has legs 28 with leaf spring tines 29 that are slidable upwardly in plate 22 through slots 30 therein, as shown in FIG. 4. This construction makes possible an easy assembly because there is a snap fit. Tines 29 are again shown in FIG. 5. Note will be taken that the purpose of spring 27 is to preload diaphragm 20.

As shown in FIG. 2, a main conductive leaf spring 31 has a concave hemispherical portion 32 to which is bonded a dielectric sphere 33 that bears against the lower surface of spring 27. Another conductive metal leaf spring 34 has a hemispherical electrical contact 35 which touches spring 31.

A conductive metal leaf spring 36 acts as an overtravel spring and is spot welded to spring 31 at 37. When unstressed, before spot welding at 37, spring 36 may be supplied with an appropriate bend at 38 so that end 39 will touch spring 31 when not lifted away therefrom by engagement of an electrical contact 40 with a contact 41 on spring 36.

Contacts 40 and 41 both may be made of gold or a gold alloy and bonded to conductive metal leaf springs 42 and 36, respectively.

Figure 3:
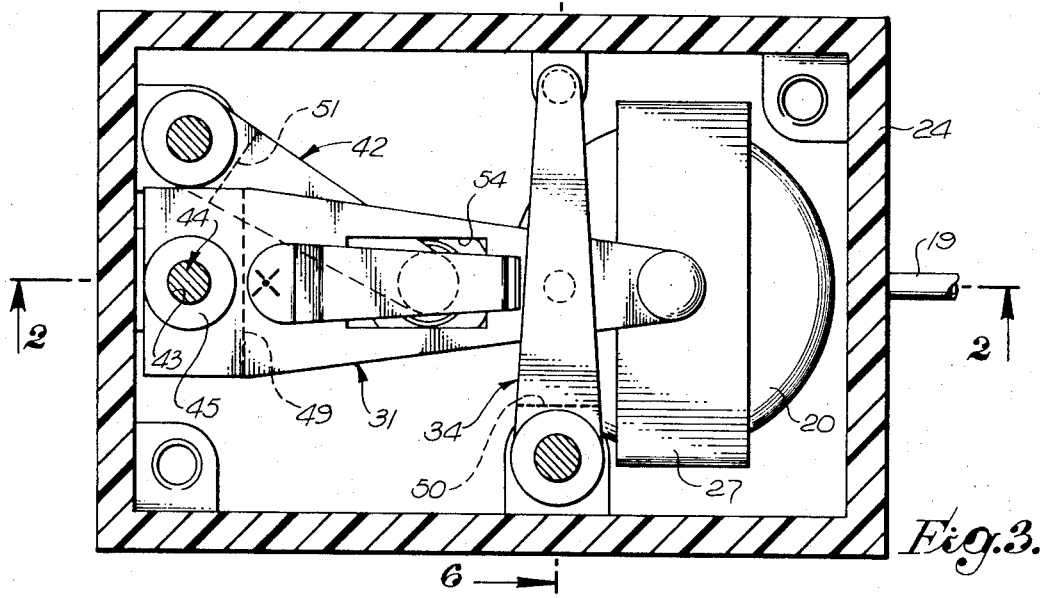
FIG. 3 is a horizontal sectional view of the thermostat portion taken on the line 3—3 shown in FIG. 2.

As shown in FIG. 3, leaf spring 31 has a hole 43 through which an electrical connector pin 44 projects.

Spring 31 is thus maintained in compression between a flange 45 integral with pin 44 and an insulator 46 having a flange 47. Pin 44 is press-fit into insulator 46.

All of the leaf springs 31, 36 and 42 may be, if desired, mounted in an identical manner with pins identical to pin 44 and insulators identical to insulator 46.

As shown in FIG. 2, a spherical dielectric body 48 is bonded to the right end of spring 42 in the same manner that body 33 is bonded to spring 31. Bodies 48 and 33 are thus in the shape of balls. Balls 48 and 33 bear against calibration screw 25 and spring 27, respectively.

As shown in FIG. 3, springs 31, 34 and 42 may be, if not otherwise positioned to do so, bent, for example, on lines 49, 50 and 51 shown in FIG. 3 to be "prestressed." That is, they are either shaped or positioned or both normally to lie in pressure contact with other corresponding structures. For example, spring 31 is positioned and shaped in a manner such that ball 33 lies in pressure contact with spring 27. Similarly, spring 34 is shaped and positioned in a manner such that contact 35 lies in engagement with spring 31 so long as the end 52 of spring 34 does not lie in engagement with set screw 53, shown in FIG. 6.

Still further, spring 42 is shaped and positioned in a manner such that ball 48 lies in pressure contact with calibration screw 25.

As shown in FIG. 3, spring 31 has a hole 54 therethrough through which contact 40 makes with contact 41. See also FIG. 2.

As indicated previously, the system of the present invention may be employed to keep an oven warm, for example, at 170° F., after food in the oven has cooked. The temperature setting to keep the oven warm may be achieved by turning screw 53, shown in FIG. 6.

Figure 6:
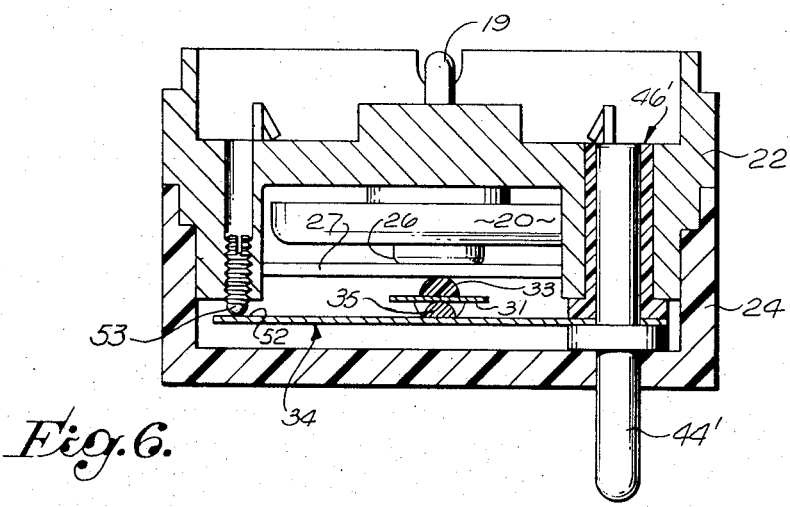
FIG. 6 is an inverted vertical sectional view of the thermostat portion taken on the line 6—6 shown in FIG. 3.

Pin 44' identical to pin 44 is also shown in FIG. 6 with an insulator 46' identical to insulator 46. The pin and insulator for spring 42 may be longer or shorter than pin 44 and insulator 46, if desired to keep spring 42 spaced from spring 31, as shown in FIG. 2. The same is true of the location of that portion of plate 22 surrounding the insulator employed in mounting spring 42.

Figure 7:
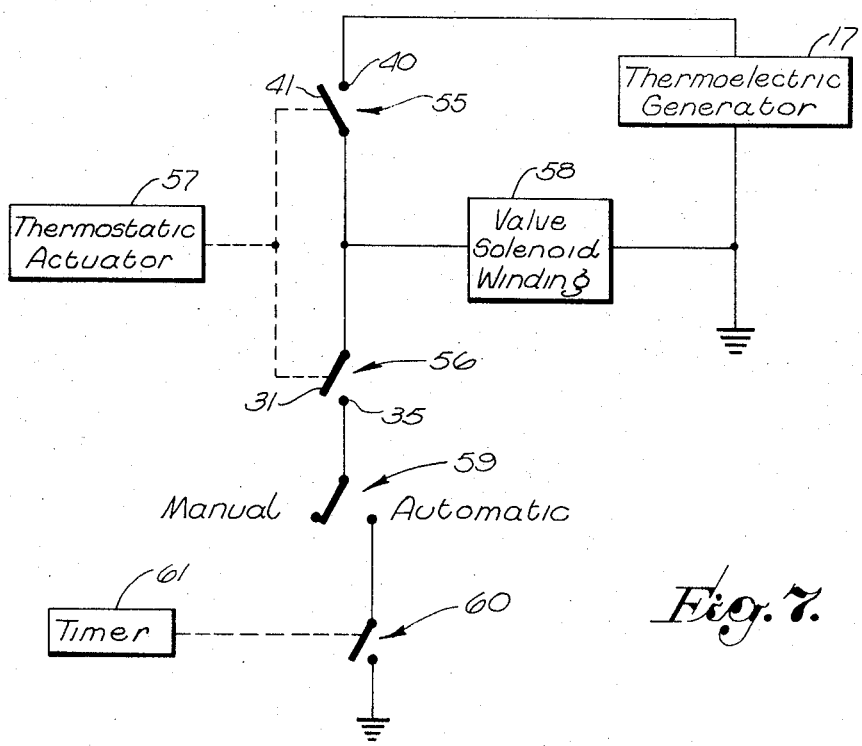
FIG. 7 is a block diagram of the system of the present invention.

In FIG. 7, the switch which is formed by contacts 40 and 41 is indicated at 55. The switch which is formed between contact 35 and spring 31 is indicated at 56. All of the structure required to operate switches 55 and 56 is identified by the legend "thermostatic actuator" and given the reference numeral 57. Thermoelectric generator 17 is connected from ground to contact 40. Valve 15 has a solenoid winding 58 which is connected from ground to both contact 41 and leaf spring 31. A manual-automatic switch 59 and a timer switch 60 are connected in that order from contact 35 to ground. A timer 61 operates timer switch 60.

OPERATION

In the operation of the invention, assume that shaft 21 is turned to its off position. In that case, the contacts 40 and 41 will break, spring 27 keeping springs 31 and 36 spaced from spring 42 and thereby preventing contact 41 from touching contact 40. Generator 17 will thus not be connected to winding 58, and switch 55 will be open. Valve 15 will thus be deenergized, and main burner 14 will receive no gas for combustion.

The normal position for switch 59 will be the "manual" position. In this way, the oven can be operated without the keep warm feature. This is true because the closure of all three of the switches 56, 59 and 60 will cause winding 58 and/or generator 17 to be short circuited.

With switch 59 in the manual position, shaft 21 may be turned to a baking temperature, and food cooked without the benefit of timer 61 for any length of time desired. During this mode of operation, contact 40 is placed in engagement with contact 41 and generator 17 energizes winding 58 through the closing of switch 55 until the oven comes up to temperature. When the oven slightly exceeds the set baking temperature, spring 27 will be expanded downwardly by diaphragm 20, as shown in FIG. 2, and spring 31 will engage spring end 39 and lift contact 41 out of engagement with contact 40. As the oven cools, contacts 40 and 41 will make again and the process will be repeated. Shaft 21 may then eventually be set to its off position.

Timer 61 is of the type such that when it is set to time a predetermined period, switch 60 is open. When the timer 61 runs down to zero, switch 60 closes. Thus, for timed cooking, switch 59 is moved to its automatic position, and timer 61 is turned to time a predetermined period. Switch 60 is then open. Shaft 21 is then turned to a desired baking temperature. So long as timer 61 keeps switch 60 open, baking takes place in a manner exactly the same as that previously described herein. When switch 60 closes, note will be taken that, in general, shaft 21 will be set to a baking temperature substantially above the keep warm temperature. For this reason, contact 35 will always be in engagement with spring 31 when switch 60 closes. Switch 59 stays in the "automatic" position until the oven is shut completely off. Thus, all of the switches 56, 59 and 60 are closed. The same is true of switch 55 when switch 60 closes. Hence, generator 17 and winding 58 are both short circuited through the switches shown in FIG. 7. Valve 15, therefore, closes and oven 10 cools down until slightly below the keep warm temperature. In this case, spring 31 will follow spring 27 upwardly in FIG. 6 and move out of engagement with contact 35. This will open switch 56 and remove the short circuit. Winding 58 will then again be energized, and valve 15 will be opened. Oven 10 will then be again heated to slightly above the keep warm temperature, and spring 27 will move spring 31 downwardly into engagement with contact 35. Again, generator 17 and winding 58 will be short circuited. The process will be repeated continuously until switch 59 is moved to the manual position and shaft 21 is turned to the off position.

If desired, timer 61 may be of the type which incorporates the function of switch 59 by having both a zero-time and an off position spaced from the zero-time position. In the off position, switch 60 is open. If this is the case, switch 59 may be omitted.

Although the system of FIG. 7 has been shown to have a ground reference, an ungrounded system is also within the scope of the present invention.

It is also a feature of the invention that spring 31 may be solid without aperture 54, and overtravel spring 36 may be eliminated if the invention is to be operated without the keep warm feature.

What is claimed is:

1. An oven comprising: a housing having a gas inlet fixed therethrough; a main burner fixed inside said housing; a solenoid valve connected between said inlet and said main burner, said valve having solenoid winding means; a pilot burner fixed in said housing and connected from said inlet; thermoelectric generator means fixed in said housing in a position to be heated by gas burning at the outlet of said pilot burner; first, second and third switches; a timer to operate said third switch; and a thermostatic actuator having a temperature sensor fixed in said housing, said actuator being constructed and positioned to actuate said first and second switches, said first switch being closed by said actuator when the temperature in said housing rises above a first predetermined temperature and being opened when said housing temperature falls below said first predetermined temperature, said second switch being closed when said housing temperature falls below a second predetermined temperature and being opened when said housing temperature rises above said second predetermined temperature, said second switch and said thermoelectric generator and winding means being connected in a closed loop series circuit, said first and third switches being connected in series in a shunt path from one side of one of said generator and winding means to the other side thereof, said one means being short circuited by said shunt path when all the series switches connected therein are closed, said actuator including a mounting member, a shaft adjustably mounted on said mounting member, said first and second switches each having first and second contacts, said second switch first contact being moved by said shaft, a device mounted on said mounting member having a part which moves in first and second opposite directions when the temperature of said sensor decreases and increases, respectively, an actuating member mounted on said mounting member and biased against said movable part, an over-travel member connected from said rotating member and being movable away therefrom by engagement of said one shaft and therewith, said over-travel member having said second switch contact fixed thereto in a position to engage said second switch first contact, an auxiliary member mounted on said mounting member on the side of said actuating member opposite the side on which said movable part is located, said auxiliary member being biased against said actuating member, said first switch first and second contacts being fixed to said actuating and auxiliary members in positions engageable with each other, and a stop to prevent said auxiliary member from following said actuating member closer to said actuating member at a predetermined position on its travel.

2. The invention as defined in claim 1, wherein said first predetermined temperature is lower than said second predetermined temperature, said one means being said winding means, said second switch having contacts plated with one of the metals gold and platinum.

3. The invention as defined in claim 2, wherein said timer keeps said third switch open when it is set to time a period larger than zero, said timer closing said third switch when said timer runs down to zero, said timer being capable of being set manually to an off position, said third switch being opened when said timer is set to its off position.

4. The invention as defined in claim 2, wherein a fourth switch is connected in series in said shunt path.

5. The invention as defined in claim 1, wherein said timer keeps said third switch open when it is set to time a period larger than zero, said timer closing said third switch when said timer runs down to zero, said timer being capable of being set manually to an off position, said third switch being opened when said timer is set to its off position.

6. The invention as defined in claim 1, wherein a fourth switch is connected in series in said shunt path.

7. The invention as defined in claim 1, wherein said mounting member includes a mounting plate, said shaft being threaded through said plate, said shaft being rotatably adjustable from one side of said plate and having one end exposed on the other side thereof, a first cantilever leaf spring having a fixed end mounted on said one side of said plate and a free end movable toward and away from said plate, a first dielectric fixed to one side of said first spring in a position to engage said one shaft end, the free end of the other side of said first spring having said second switch first fixed relative thereto, said first spring being prestressed to hold said first dielectric in engagement with said one shaft end, said actuating member including a second cantilever leaf spring having a fixed end mounted on said plate, said device being connected from said sensor, said part being movable toward and away from said plate when the temperature of said sensor decreases and increases, respectively, said second spring being located on the side of said part opposite the side thereof on which said plate is located, said second spring having a free end movable toward and away from said plate, a second dielectric fixed to one side of said second spring free end in a position to engage said movable part, said second spring being prestressed to hold said second dielectric in engagement with said over-travel member including a third cantilever leaf spring electrically connected with said second spring and mounted on the side thereof farthest from said one plate side in a position to be moved upwardly thereby, the free end of said third spring being positioned to engage said first spring free end, said second switch second contact being fixed relative thereto formed on said third spring free end in a position to engage said second switch first contact said auxiliary member including a fourth cantilever leaf spring having a fixed end mounted on said plate in a position such that movement of said second spring away from said plate will cause first and second areas fixed relative to said second and fourth springs to touch each other, said first and second first switch contacts being the contacting areas of said first and second contacts, respectively, first and second areas, respectively, said fourth spring being positioned to move toward and away from said one plate side on the side of said second spring opposite said one plate side.

8. The invention as defined in claim 7, wherein said device includes a flexible diaphragm, said movable part being a spring mounted on said plate in a position to bias said diaphragm in a direction toward said one plate side.

* * * * *